United States Patent [19]

Storandt

[11] 4,257,387
[45] Mar. 24, 1981

[54] FIRE STARTER UNIT

[76] Inventor: Duane L. Storandt, P.O. Box 6813, St. Louis, Mo. 63144

[21] Appl. No.: 56,081

[22] Filed: Jul. 9, 1979

[51] Int. Cl.³ .......................... A47J 37/00; F24B 3/00
[52] U.S. Cl. ....................................... 126/25 B; 44/39; 126/29; 220/19; 224/45 W; 294/26.5
[58] Field of Search ...................... 126/25 R, 25 B, 29, 126/30; 224/45 W; 294/26.5; 220/19; 44/34, 38–40; 99/421 A

[56] References Cited

U.S. PATENT DOCUMENTS

| | | | |
|---|---|---|---|
| 2,741,392 | 4/1956 | Weiss | 220/19 |
| 2,846,941 | 8/1958 | Goodwin | 220/19 |
| 3,604,408 | 9/1971 | Tescula | 126/25 R |

Primary Examiner—Ronald C. Capossela
Attorney, Agent, or Firm—Cohn, Powell & Hind

[57] ABSTRACT

This fire starter unit includes a hollow body providing a combustion chamber and formed from identical panels having inwardly bent overlappingly interconnectible side margins. A wire grate disposed within the body is carried by the panels and provides a stiffener for the body. A carrying handle is attached to the overlapping side margins at one corner of the body and the body is configured to retain a removable grill at the upper end.

11 Claims, 7 Drawing Figures

FIRE STARTER UNIT

BACKGROUND OF THE INVENTION

This invention relates generally to fire starters and particularly to a fire starter of the combustion chamber type.

The use and misuse of starter fuel, for barbeque fires in particular, has caused many serious burning injuries through the years. Further, even when used with care, starter fluid has the disadvantage of having an unpleasant odor and, used directly on charcoal briquets, can detrimentally effect the flavor of the cooking. It is also expensive. These disadvantages have resulted in the development of alternative forms of fire starters, one of which has been the combustion chamber type of unit by which a few charcoal briquets are burned to the stage where they can be added to a pile of briquets in a barbeque unit.

Unfortunately, such units have not been entirely successful. This is at least in part due to the fact that making the combustion chamber units sufficiently rigid has led to such units being overly heavy and awkward to handle. A related disadvantage is that heavy units also tend to be expensive. On the other hand insufficiently rigid units tend to flex at the corners and at the handle connections which produce metal fatigue resulting in a short lasting unit.

The present unit overcomes these and other problems in a manner not disclosed in the known prior art.

SUMMARY OF THE INVENTION

This fire starter unit provides a combustion chamber means for igniting solid fuel, such as charcoal briquets, without assistance from fire starter fuel.

The fire starter unit provides a hollow body formed from a plurality of opposed pairs of adjacent, interconnected panels; each panel including upper and lower margins and side margins and at least one aperture disposed between said side margin portions, said panel side margin portions being interconnected by fastener means. A grate is received within the body, said grate including a plurality of upper members disposed in side-by-side relation; the upper members including at least one member having opposed ends received within the apertures of opposed panels and at least one member having opposed ends disposed adjacent opposed panels; and said grate including a plurality of lower members disposed in side-by-side relation substantially perpendicular to said upper members, said lower members including at least one member having opposed ends received within the apertures of opposed panels and at least one member having opposed ends disposed adjacent opposed panels. A carrying handle is attached to the body.

According to one aspect of the invention the side margin portions are inwardly bent, and the side margin portions of adjacent panels are overlappingly connected by the fastener means.

According to another aspect of the invention the inward bending of the side margin portions is to an angle greater than 45° from the plane of the panel so that said panels are inwardly bowed when said side margins are connected.

According to another aspect of the invention each panel includes at least one transversely disposed, inwardly formed rib having at least two apertures, and the grate is formed from wire members including at least two upper members having opposed ends received in the rib apertures of opposed panels, at least two lower members having opposed ends received in the rib apertures of opposed panels, at least two alternately spaced upper members having opposed ends received in the rib apertures of opposed panels, and at least two alternately spaced lower members having opposed ends adjacent the apertured ribs of opposed panels.

According to yet another aspect of the invention the perpendicularly related upper and lower grate members are rigidly connected at their intersection points and the rib apertures are substantially twice the diameter of the grate members.

According to still another aspect of the invention each panel includes a plurality of longitudinally spaced transversely disposed ribs extending substantially the width of the panel including the side margin portions.

According to another aspect of the invention the handle includes a pistol grip and end portions connected to the margin portions of a pair of spaced ribs.

In yet another aspect of the invention the upper and lower margin portions include an intermediate cut-out portion having opposed pairs of inclined, intersectingly related side cuts, one of said side cuts having an angle of inclination substantially in excess of the inclination angle of the other of said side cuts.

In another aspect of the invention a removable grill is carried by the body, said grill including a plurality of elongate members engageable by opposed upper margin portions and a peripheral frame rigidly connected to said members in depending relation below the upper limits of said upper margin portions.

DESCRIPTION OF THE PREFERRED EMBODIMENT

Figure 2:
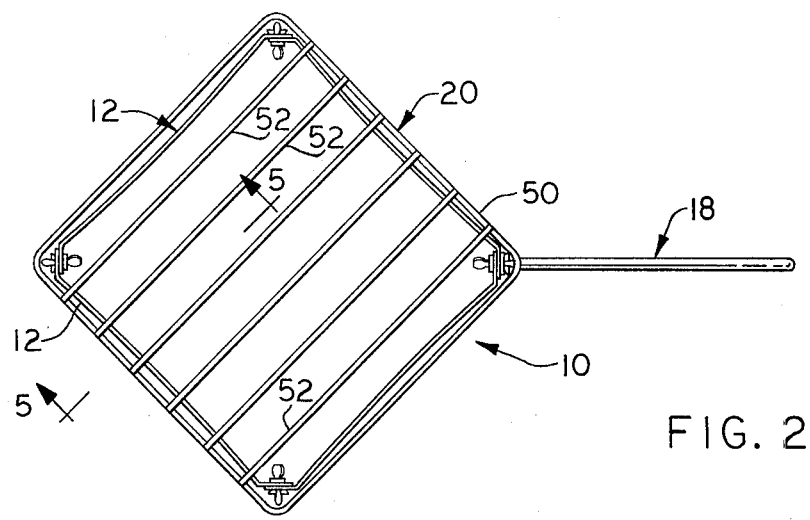
FIG. 2 is a plan view showing the grill.
Figure 1:
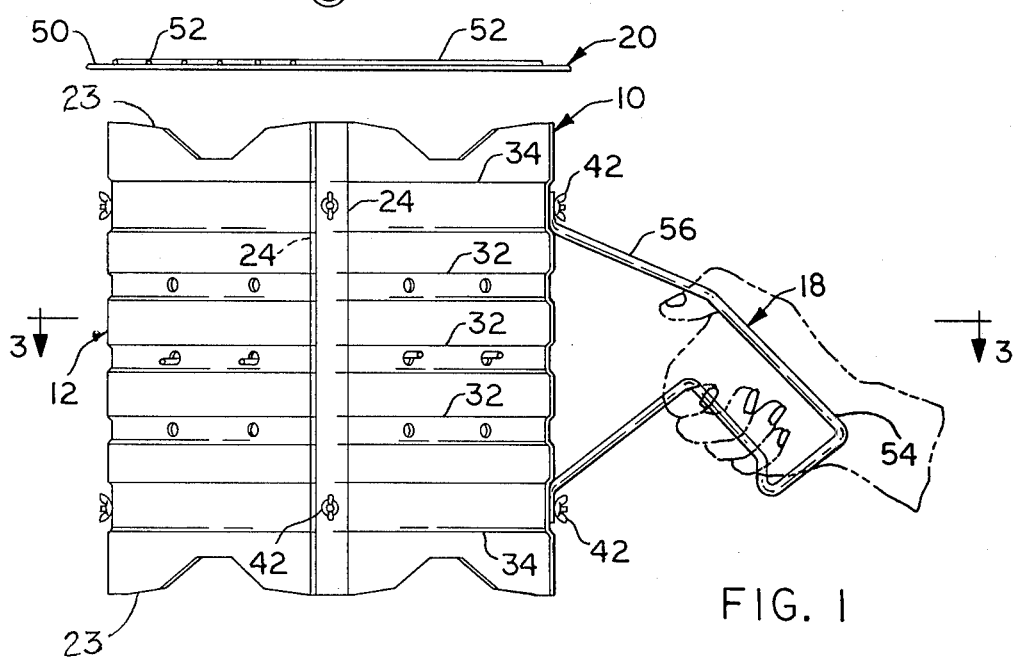
FIG. 1 is a side elevational view of the assembled fire starter unit.
Figure 3:
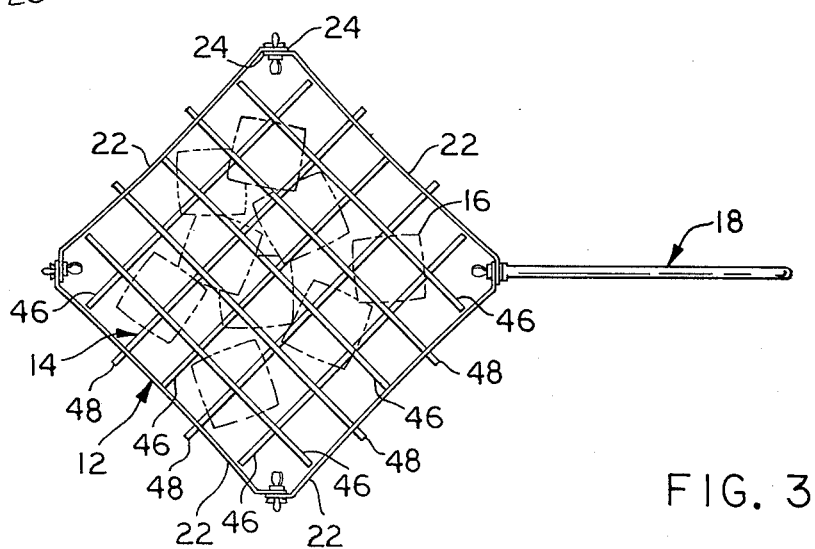
FIG. 3 is a cross sectional view taken on line 3—3 of FIG. 1 showing the grate.
Figure 4:
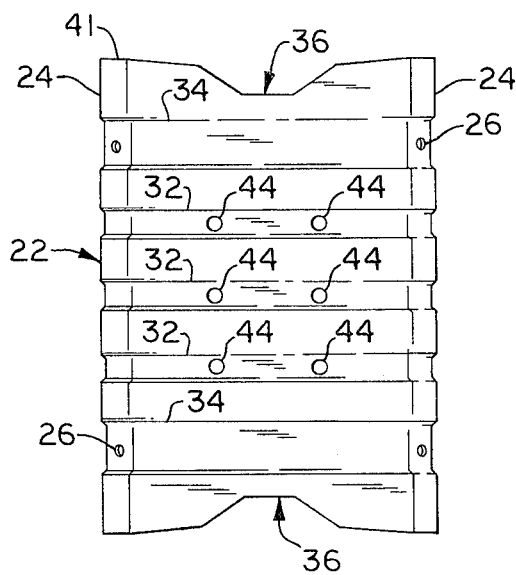
FIG. 4 is a side elevational view of an individual panel prior to assembly.
Figure 6:
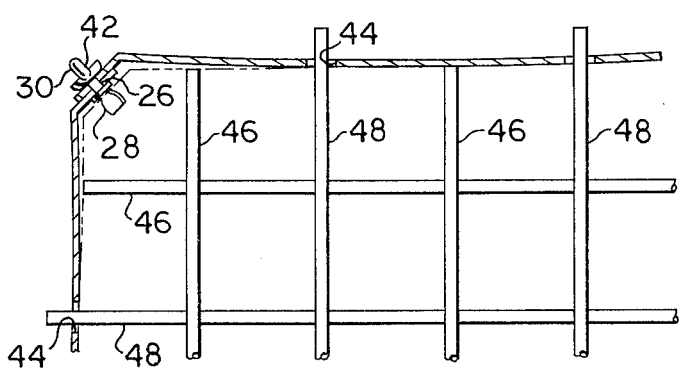
FIG. 6 is a cross sectional view taken on line 6—6 of FIG. 5.
Figure 7:
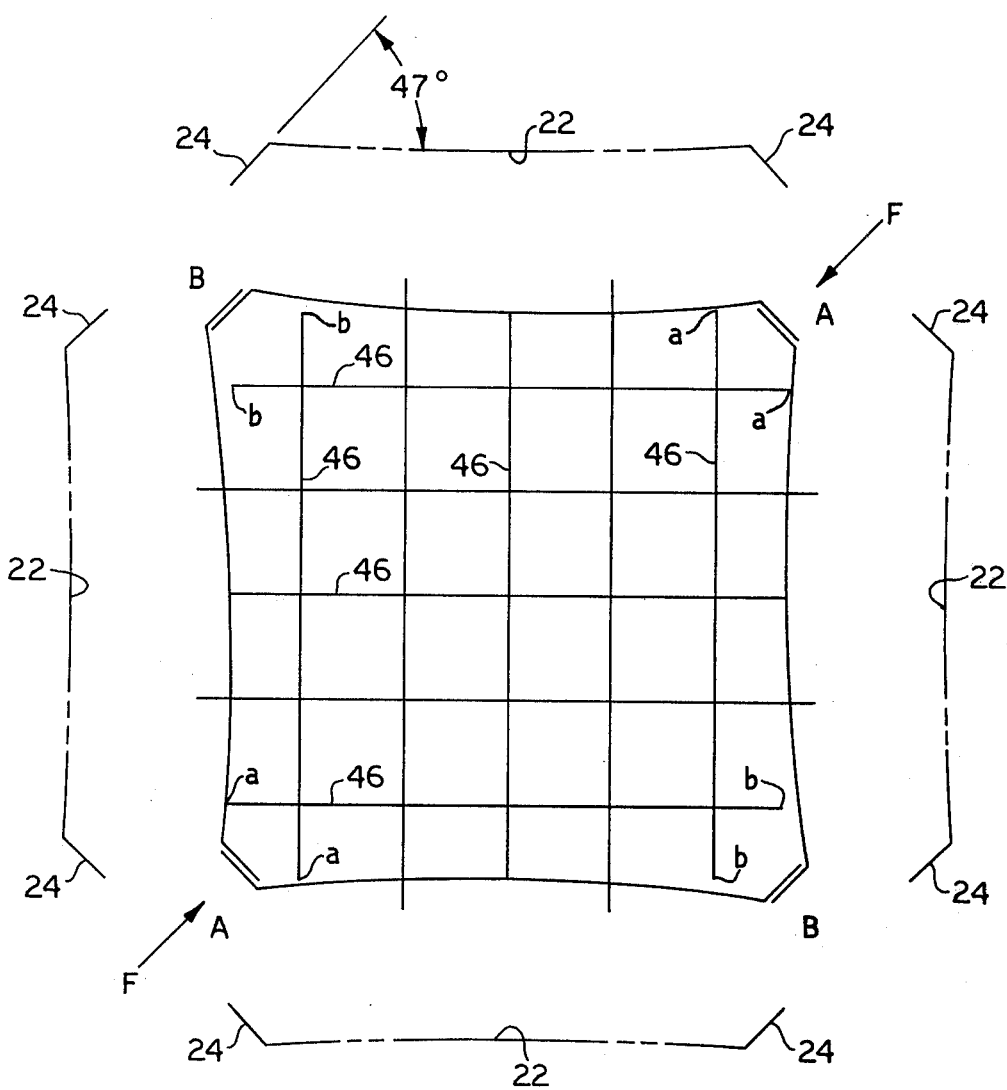
FIG. 7 is a schematic plan view showing the stiffener action of the grate.

Referring now by reference numerals to the drawings and first to FIGS. 1-3 it will be understood that the fire starter unit 10 is intended to provide a combustion chamber in the form of a hollow body 12, which is provided with a grate 14 disposed intermediate the ends of the body. The grate 14 is intended to hold charcoal briquets or the like, such as indicated by numeral 16, above a combustion area and the unit is provided with a handle 18 connected to the body 12. A separate grill 20 is provided which overfits said body and the various components will now be described more specifically as follows:

The body 12 is open at the top and bottom and is formed from a plurality of identical panels 22, four in number in the preferred embodiment, which are symmetrical about both the longitudinal and transverse axes and are defined by upper and lower margin portions 23 and side margin portions 24. Also in the preferred embodiment the panels 22 are formed from 0.4 millimeter sheet metal and, as shown in FIGS. 4 and 6, longitudinal side margin portions 24 are inwardly bent and are apertured at 26, so that overlapping side margin portions 24 can be interconnected by means of a thumb screw 28 and wing nut 30. As shown schematically in FIG. 7, the side margin portions 24, as used for a generally square device, are overbent beyond the normal angle of forty-five degrees (45°) to an angle of forty-seven degrees (47°) so that when connected together in clamped relation by the thumb screws there is a tendency for the panels to bow inwardly. In addition, the panel has a slight initial bow built into it during manufacture as also shown in FIG. 7. This bowing serves a particular purpose as will be described later.

The upper and lower panel margins 23 include cut-out portions 36 defined by symmetrically formed, inclined cuts 38 and intersecting, inclined cuts 40, said latter cuts being of a much reduced angle of inclination and terminating at the margin portion 24. The nature of the cut-outs 36 provided at each end of panels 22 is such that, as shown in FIG. 4, the size of the cut-out 36, which receives an upward air draft, can be controlled without rendering the body 12 unstable since the body, because of the small angle of inclination of cuts 40, tends to be supported at its corners by flats 41.

Figure 5:
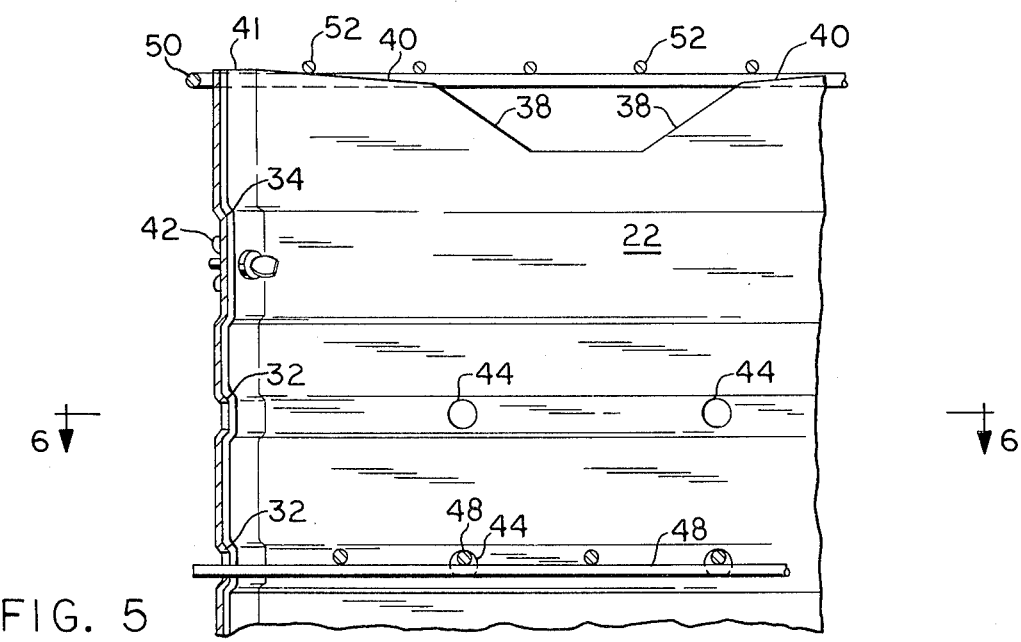
FIG. 5 is an enlarged fragmentary longitudinal sectional view taken on line 5—5 of FIG. 2.

As best shown in FIGS. 4 and 5 each panel includes a plurality of inwardly formed, intermediate reinforcing ribs 32 and a pair of outer, inwardly formed, somewhat wider reinforcing ribs 34. The ribs 32 and 34 extend the full width of the panel including the side margin portions 24 and add considerable stiffness to the panel at the connection points of the handle 18 and the grate positions. The ribs also resist flexing and tend to prevent panel cracking due to metal fatigue after prolonged use. In addition, the full length ribs avoid panel distortion, which can occur with partial ribs, and also permit the panels to be easily nested for storage.

The apertures 26 by which the panels are interconnected are disposed within the margin portions of the outer ribs 34. In the preferred embodiment these outer ribs are sufficiently wide to completely accommodate the flattened end portions 42 of the handle 18 and facilitate the connection of said flattened end portions to the overlapping margin portions. This structural arrangement of parts permits the handle 18 to be connected tightly and avoids crushing of the rib edges by bridging of the handle ends thereacross.

The intermediate ribs 32 each include a pair of apertures 44, which are positioned to receive the grate 14. The grate is formed from upper and lower layers of elongate wire members, each layer including a plurality of members 46, disposed entirely within the body, alternated with members 48, the ends of which are received by the panel apertures 44. As clearly shown in FIG. 5 the panel apertures 44 have a diameter about twice that of the wire members 46 and 48 providing the grate. Because of this, the relatively long upper layer members 48 are received by the upper portion of said apertures 44 while the relatively long lower layer members 48 are received by the lower portion of the corresponding apertures 44 in the adjacent panel. This structural arrangement of parts, avoids the necessity for either bending the grate members or providing apertures at a different elevation in each panel. The grate construction is thereby simplified and all panels can be made exactly identical.

The grate 14 is particularly effective in acting as a transverse stiffener for the box-like form of the body 12 because of the close proximity of the ends of the wire members 46 to the inside face of adjacent panels 22. The structural action of the grate can be demonstrated by reference to FIG. 7 in which it is assumed that opposite forces tending to collapse the body are applied to opposite corners A. As the corners A under the influences of forces F tend to approach one another the ends of the upper and lower corner members 46 designated by a tend to engage the panels 22 whereas the ends b of the members 46 closest to opposed corners B tend to move away from said panels. Thus, the grate, in effect, acts as a strut extending across corners A resisting the action of the force F. The inwardly curved nature of the panels 22 tends to cause the members 46 to engage and abut the panels under the resilient action of the panel and further assists in providing engagement between the grate 14 and the panels 22 without resort to closely machined parts. In addition, the inward bowing of the panels 22 also tends to prevent the grate 14 from falling out of place. Further, the resultant inward bowing of the ribbed panels provides particularly effective stiffening in that the "arching" effect resists outward deflection of the panels intermediate their ends.

The grill 20 is, in the preferred embodiment, formed from a continuous framing member 50 and a plurality of upper cross members 52. The framing member 50 is carried by the hollow body 12 and is sized so that it comfortably receives the upper end of the body 12. This structural arrangement of parts is clearly shown in FIG. 5 and, because of the depending nature of the frame 50, the structural arrangement of grill parts is such as to preclude the grill slipping off the upper portion of the body, because the corner portions of the frame 50 engage the upper portions of the side margins 24 when the grill is moved laterally. Further, the slight inclination of the cut 40 provides that even the upper grill members 52 are disposed slightly below the upper end corners of the body, which further facilitates the tendency of the grill to be maintained in place.

The handle 18 clearly shown in FIG. 1 is formed so that the relatively narrow pistol grip portion 54 is disposed in spaced relation from the body 12 by means of a connecting portion generally indicated by numeral 56. The handle is attached to the body 12 at a location defined by the outer ribs 34 as discussed above. This provides a vertical spacing considerably in excess of the width of the pistol grip portion 54 thereby providing a substantially greater spacing of the attachment points and a consequent reduction in the transference of concentrated load between the handle and the body.

It is thought that the structural features and functional advantages of the fire starter unit 10 have been made fully apparent from the foregoing description of parts. However, for completeness of disclosure the assembly and use of the unit will be briefly described.

The starter unit is loosely assembled by using the thumb screws and wing nuts 28 and 30 to connect the side margins 24 of three panels 22 together, leaving off one panel. The grate 14 is then placed in position at the desired elevation by inserting appropriate grate members 48 within the panel apertures 44. The wing nuts 28 can then be tightened and the final panel 22 placed in position by connecting the handle 18 to the final overlapping margins 24 by means of thumb screws and wing nuts 28 and 30. The thumb screws and wing nuts can then be hand tightened and the panel side margins 24 adjusted by tucking them together just before tightening, which forces the panels into greater bowing configuration tending to abut up against the stabilizing short wires of the grate 14. The resultant hollow body has a somewhat octagonal appearance defined by alternating long sides and short corners.

In use, several briquets 16 are placed on the grate 14 and crumpled wads of paper are inserted under the charcoal and lighted. If it becomes necessary to add paper, the pistol grip handle 18 is firmly held and the unit tilted slightly to provide sufficient space to add additional small paper wads. When all briquets are properly ignited the operator should stand with the wind at his back and deposit the briquets onto his barbeque unit (not shown), using both hands. In this way any developing sparks will blow away from the operator. Of course, common sense precaution should be observed as far as other persons in the barbeque area are concerned.

The unit 10 can be converted into a cooker by placing the grill in position as shown in FIGS. 3 and 4 so that it is held in place against lateral movement by the structural arrangement of the frame and the corners of the unit.

The height of the grate can be readily adjusted to any of three levels by simply removing one panel 22 slackening off the fasteners connecting the other three panels 22 removing the grate 14 from one set of rib apertures 44 and placing it in another set and then replacing the removed panel. Such adjustment will facilitate the cooking of particular foods and also provide a variable amount of space to accommodate greater or fewer briquets.

I claim as my invention:

1. A fire starter unit, comprising:
   (a) a hollow body formed from a plurality of opposed pairs of adjacent interconnected panels, each panel including:
      1. oppositely disposed upper and lower margin portions,
      2. oppositely disposed side margin portions, and
      3. at least one aperture disposed intermediate said side margin portions,
   (b) fastener means connecting the side margin portions of adjacent panels,
   (c) a grate received within the hollow body and including:
      1. a plurality of upper members disposed in side-by-side spaced relation including at least one member having opposed ends received within the panel apertures of opposed panels, and at least one member having opposed ends disposed adjacent opposed panels, and
      2. a plurality of lower members disposed in side-by-side spaced relation, substantially perpendicular to said upper members, and including at least one member having opposed ends received within the panel apertures of opposed panels, and at least one member having opposed ends disposed adjacent opposed panels, and
   (d) a carrying handle attached to the body.

2. A fire starter unit as defined in claim 1, in which:
   (e) the side margin portions are inwardly bent and the side margin portions of adjacent panels are overlappingly connected by said fastener means.

3. A fire starter unit as defined in claim 2, in which:
   (f) the side margin portions are bent inwardly at an angle greater than 45° from the plane of the panel whereby panel portions between said side margins are inwardly bowed when said side margins are connected.

4. A fire starter unit as defined in claim 1, in which:
   (e) each panel includes at least one transversely disposed inwardly formed rib including at least two apertures, and
   (f) the grate is formed from wire members including:
      1. at least two upper members having opposed ends received in the rib apertures of opposed panels and at least two lower members having opposed ends received in the rib apertures of opposed panels, and
      2. at least two alternately spaced upper members having opposed end received in the rib apertures of opposed panels and at least two alternately spaced lower members having opposed ends adjacent the apertured ribs of opposed panels.

5. A fire starter unit as defined in claim 4, in which:
   (g) the perpendicularly related upper and lower grate members are rigidly connected at their intersection points, and
   (h) the rib apertures are substantially twice the diameter of the grate members.

6. A fire starter unit as defined in claim 2, in which:
   (f) each panel includes a plurality of longitudinally spaced, transversely disposed ribs extending substantially the width of the panel, including the side margin portions.

7. A fire starter unit as defined in claim 6, in which:
   (g) the handle includes flattened end portions connected to the margin portions of a pair of spaced ribs said end portions being shorter than the width of said ribs.

8. A fire starter unit as defined in claim 1, in which:
   (e) the upper and lower margin portions include an intermediate cut out portion, each cut out portion including opposed pairs of inclined intersectingly related side cuts, one of said side cuts having an angle of inclination substantially in excess of the inclination angle of the other of said side cuts.

9. A fire starter unit as defined in claim 1, in which:
   (e) a removable grill is carried by said body, said grill including a plurality of elongate members engageable by opposed upper margin portions and a peripheral frame rigidly connected to said members in depending relation below the upper limits of said upper margin portions.

10. A fire starter unit as defined in claim 1, in which:
    (e) the panels are inwardly bowed intermediate the ends thereof.

11. A fire starter unit comprising:
    (a) a hollow body formed from opposed pairs of generally rectangular, identically formed side panels, each including:
       1. oppositely disposed upper and lower margin portions including intermediate cut-out portions,
       2. oppositely disposed inwardly bent and overlappingly related side margin portions,
       3. a plurality of intermediate, longitudinally spaced, transversely disposed ribs extending substantially the width of the panel, including the side margin portions, each rib being inwardly formed and including a pair of transversely spaced apertures, and
       4. upper and lower longitudinally spaced, transversely disposed ribs extending substantially the width of the panel including the side margin portions, each rib being inwardly formed and including a pair of connection apertures disposed in said margin portions,
(b) thumb screw and wing nut fastener means connecting adjacent panel portions together using said connection apertures,
(c) a height-adjustable wire grate received within the hollow body and including:
1. a plurality of upper members disposed in side-by-side relation including a pair of members having opposed ends received within said intermediate rib apertures of opposed panels and a plurality of shorter members alternately spaced with said members and having opposed ends adjacent said apertured ribs of opposed panels,
2. a plurality of lower members disposed in side-by-side spaced relation substantially perpendicular to said upper members and rigidly attached thereto including a pair of members having opposed ends received within said intermediate rib apertures of opposed panels, and a plurality of shorter members alternately spaced with said members and having opposed ends adjacent said apertured ribs of opposed panels,
3. said upper and lower members being of a diameter about half that of the receiving panel apertures, and
4. whereby diagonally opposite ends of said shorter members tend to engage adjacent panels when said near diagonally opposite body portion tend to approach each other, and
(d) a handle, including a pistol grip portion and apertured upper and lower end portions connected to an overlapped pair of adjacent margin portions in said upper and lower rib connection apertures.

* * * * *